April 2, 1935.  H. HOUSE  1,996,293

INSECT CATCHING LAMP

Filed Aug. 18, 1933

INVENTOR
H. House
BY
ATTORNEY

Patented Apr. 2, 1935

1,996,293

UNITED STATES PATENT OFFICE 1,996,293

INSECT CATCHING LAMP

Horace House, Oroville, Calif.

Application August 18, 1933, Serial No. 685,716

4 Claims. (Cl. 43—113)

This invention relates to devices for exterminating flying insects by means of artificial light, my principal object being to provide a device of this character so constructed that any night flying insects attracted to and milling around the light will tend to fall into a liquid filled basin associated with the light and be exterminated.

A further object is to provide a device for the purpose so constructed that a relatively great volume of insect attracting light will be formed with the use of a small light source, so that the cost of operating the device is very small.

Another object is to design the structure so that it may effectively use kerosene or similar fuel, so that the device is especially adapted for localities where electricity is not available. Besides serving as an insect exterminator, the lamp also functions to give general illumination of the premises on which it is mounted.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
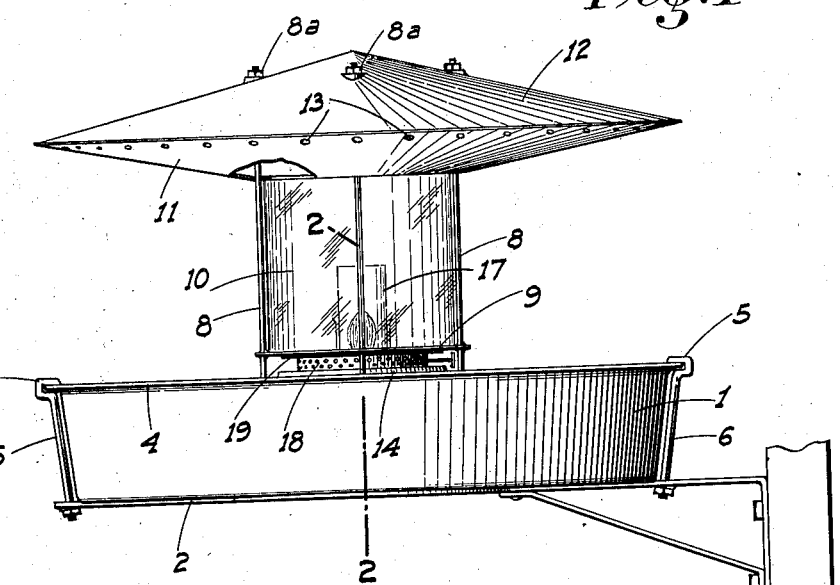
Fig. 1 is a side elevation of my improved lamp.
Figure 3:
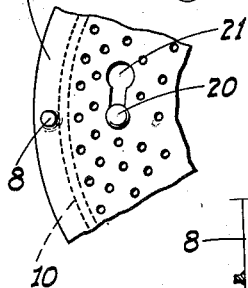
Fig. 3 is a fragmentary plan view of the draft and chimney supporting plate, showing the releasable supporting means between the lamp and plate.

Referring now more particularly to the characters of reference on the drawing, the numeral 1 denotes a cylindrical basin adapted to be supported in any suitable manner such as by a bracket plate 2 projecting laterally from a post 3. The basin is provided with an outwardly projecting rim flange 4 serving as a means for removable engagement with the slotted heads 5 of opposed retaining bolts 6 which are releasably clamped to the bracket.

The basin is formed with a central vertical cylindrical wall 7 extending the full height of the basin and forming a sleeve open at top and bottom, said wall sloping inwardly toward the top so that the sleeve and the area included thereby is of frusto-conical form.

Rods or stiff wires 8 forming a frame are secured to and project upwardly from the outer face of the wall 7 in circumferentially spaced relation, said wires supporting a perforated draft plate 9 above but somewhat close to the basin. Resting on the plate and centered thereon by the rods 8 is an outer chimney 10 of glass or the like on the top of which an outwardly and upwardly flaring reflector rests, the diameter of the reflector being greater than that of the basin. A cone shaped canopy 12 is rigid with and projects upwardly from the reflector so as to shed rain, etc., and allow the same to drop clear of the basin. This canopy also of course prevents water or dirt from getting down into the chimney. The chimney opens into the area inside the reflector and canopy, the reflector being provided with draft or ventilating openings 13 for the products of combustion from the lamp below. The rods 8 project up through the reflector and canopy maintaining the same centered; the said canopy and reflector being removably clamped against the chimney by nuts 8a on the upper ends of the rods.

Shaped to snugly fit the central basin sleeve is the oil containing vessel 14 of the lamp. A centrally disposed burner of the usual wick type indicated at 15 is mounted on top of the vessel in alinement with the central opening 16 in the draft plate 9, so that the flame from the burner can pass unobstructedly above said plate. An inner relatively small chimney 17 is supported on said plate about the opening, the inner chimney providing greater safety under certain conditions than with the use of the outer chimney alone as well as forming a wind break.

Figure 2:
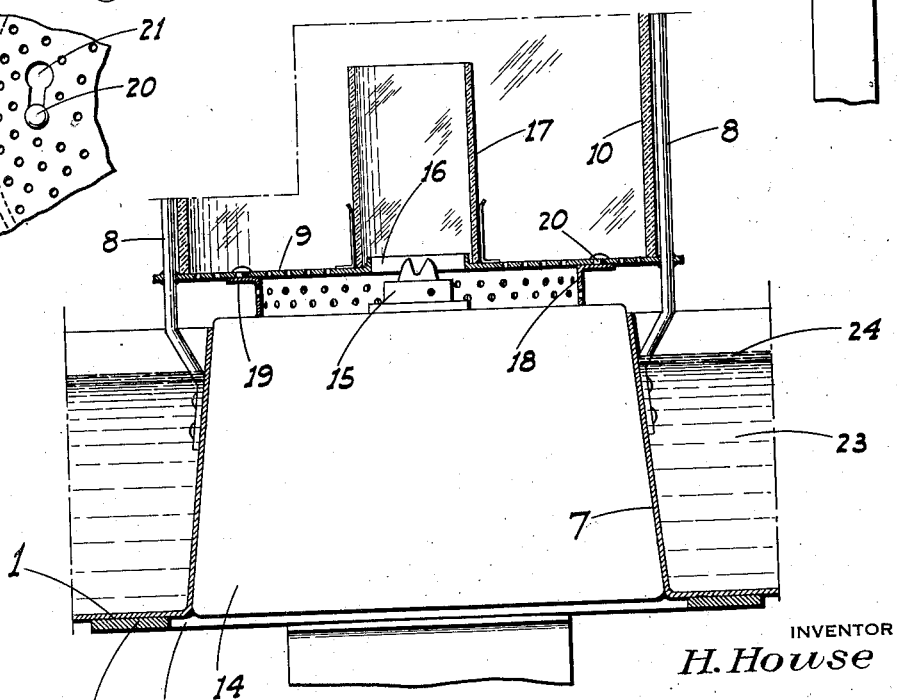
Fig. 2 is an enlarged fragmentary cross section on the line 2—2 of Fig. 1.

A perforated draft ring 18 is rigidly secured to and extends upwardly from the vessel 14 in centralized relation about the burner 15, said ring being provided with an outwardly projecting flange 19. Upstanding headed lugs or pins 20 are mounted on said flange at intervals which detachably engage keyhole slots 21 in the draft plate 9. In this manner the lamp is firmly supported in rigid relationship to the draft plate and at the same time the oil vessel 14 is drawn firmly up into the tapered sleeve of the basin. The bracket plate 2 is provided with an opening 22 larger than and in centralized relation to the vessel 14, as shown in Fig. 2, so as to permit of the dropping or insertion of the latter from underneath.

In operation the basin is nearly filled with water 23 on which is a film of oil 24. Therefore as the insects attracted by the light mill around the chimney, as they inevitably do, they will ultimately fall in the oil-covered water, the oil exerting a clinging action on the wings and feet of the insects from which they cannot escape. The reflector catches the rays of light from the lamp and not only increases the effectiveness of the light as a whole but throws said rays onto the liquid in the basin, further attracting the insects to the liquid.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An insect exterminator comprising a liquid-containing basin, a draft plate above the basin, means supporting the plate from the basin, a hydrocarbon lamp, said lamp including a reservoir for fuel disposed below and supported from the plate, a chimney supported on the plate, and a reflector supported on the chimney.

2. An insect exterminator comprising a liquid-containing basin, a draft plate above the basin, means supporting the plate from the basin, a hydrocarbon lamp, said lamp including a reservoir for fuel disposed below the plate, a draft ring upstanding from and rigid with the reservoir, a flange on said ring to abut against the under side of the plate, and headed pins on and upstanding from the flange; the plate having circumferentially extending keyhole slots for releasable supporting engagement with the pins.

3. An insect exterminator comprising a liquid-containing basin, a draft plate above the basin, a hydrocarbon lamp including a reservoir for fuel disposed below and supported from the plate, a chimney supported on the plate, a reflector supported on the chimney, and a common means supporting the plate from the basin and centralizing the reflector on the chimney.

4. An insect exterminator comprising a basin for liquid, a draft plate above the basin supported therefrom, a lamp having a frusto-conical reservoir disposed below the plate, the basin having a bottom opening through which the reservoir may pass, a wall upstanding from about the opening and engaging the sloping sided reservoir and means to detachably suspend the reservoir from the plate; said suspending means being arranged to hold the reservoir firmly against said wall.

HORACE HOUSE.